United States Patent
Hey, Jr. et al.

(10) Patent No.: US 9,304,760 B2
(45) Date of Patent: *Apr. 5, 2016

(54) IDENTIFYING SOFTWARE CODE EXPERTS

(71) Applicant: International Business Machines Corporation, Armonk, NY (US)

(72) Inventors: Laurence A. Hey, Jr., Manly (AU); William J. Izard, Sydney (AU); Matthew J. Ponsford, Manly (AU)

(73) Assignee: International Business Machines Corporation, Armonk, NY (US)

( * ) Notice: Subject to any disclaimer, the term of this patent is extended or adjusted under 35 U.S.C. 154(b) by 611 days.

This patent is subject to a terminal disclaimer.

(21) Appl. No.: 13/674,312

(22) Filed: Nov. 12, 2012

(65) Prior Publication Data

US 2014/0137072 A1    May 15, 2014

(51) Int. Cl.
  *G06F 9/44* (2006.01)
  *G06Q 10/06* (2012.01)

(52) U.S. Cl.
  CPC .......... *G06F 8/70* (2013.01); *G06Q 10/063112* (2013.01)

(58) Field of Classification Search
  CPC .......................... G06Q 10/063112; G06F 8/70
  USPC .................................................. 717/100–103
  See application file for complete search history.

(56) References Cited

U.S. PATENT DOCUMENTS

| | | | |
|---|---|---|---|
| 6,505,166 B1 * | 1/2003 | Stephanou | 705/7.14 |
| 6,507,821 B1 * | 1/2003 | Stephanou | 705/7.14 |
| 7,849,405 B1 * | 12/2010 | Coletta et al. | 715/708 |
| 8,086,699 B2 * | 12/2011 | Christopher | 709/218 |
| 8,180,780 B2 | 5/2012 | Herness et al. | |
| 2009/0012833 A1 * | 1/2009 | Kuhlke et al. | 705/9 |
| 2010/0005446 A1 | 1/2010 | Drissi et al. | |
| 2011/0252394 A1 | 10/2011 | Sharma et al. | |
| 2014/0137074 A1 * | 5/2014 | Hey | G06Q 10/063112 717/101 |

OTHER PUBLICATIONS

Carole A. Lane, "Naked in Cyberspace", 2002, published by Cyber-Age Books, chapter 12, pp. 99-110.*

* cited by examiner

*Primary Examiner* — Ted T Vo
(74) *Attorney, Agent, or Firm* — Brian J. Colandreo, Esq.; Jeffrey T. Placker, Esq.; Holland & Knight LLP

(57) ABSTRACT

A method, computer program product, and system for identifying collaborators is described. One or more software developers may be mapped to one or more software code elements. One or more expert rankings of the one or more software developers may be determined with respect to the one or more software code elements. One or more current code elements associated with an active software developer may be identified. A request for assistance from an expert may be received from the active software developer. One or more potential experts may be identified based upon, at least in part, the one or more current code elements and the one or more expert rankings.

14 Claims, 4 Drawing Sheets

IDENTIFYING SOFTWARE CODE EXPERTS

TECHNICAL FIELD

This disclosure relates to software code development.

BACKGROUND

Various individuals (and groups of individuals) may engage in the development of software code using a variety of software development tools. Different individuals engaged in such development may exhibit varying degrees of expertise and/or need for expertise with regard to various portions or aspects of software code and/or software code development.

BRIEF SUMMARY OF THE DISCLOSURE

According to one aspect of the disclosure, a computer-implemented method includes mapping, by one or more computing devices, one or more software developers to one or more software code elements. The method further includes determining, by the one or more computing devices, one or more expert rankings of the one or more software developers with respect to the one or more software code elements. The method further includes identifying, by the one or more computing devices, one or more current code elements associated with an active software developer. The method further includes receiving, by the one or more computing devices, from the active software developer, a request for assistance from an expert. The method further includes identifying, by the one or more computing devices, one or more potential experts based upon, at least in part, the one or more current code elements and the one or more expert rankings.

One or more of the following features may be included. Determining the one or more expert rankings may be based upon, at least in part, one or more of a number of code deliveries associated with the one or more software developers, a change in code complexity associated with the one or more software developers, a code quality change associated with the one or more software developers, a persistence of a code change associated with the one or more software developers, and a peer assessment associated with the one or more software developers. The one or more current code elements may be identified based upon, at least in part, a change frequency associated with one or more code elements. The one or more current code elements may be identified based upon, at least in part, receiving a threshold number of related inputs. The one or more current code elements may be identified based upon, at least in part, an amount of time one or more code elements form part of an active view. The one or more current code elements may be identified based upon, at least in part, a time-limited analysis.

Identifying the one or more potential experts may be based upon, at least in part, aggregating rankings associated with a plurality of the one or more current code elements. Identifying the one or more potential experts may be based upon, at least in part, one or more geographical locations associated with the one or more software developers, one or more time zones associated with the one or more software developers, one or more online statuses associated with the one or more software developers, and one or more calendar entries associated with the one or more software developers.

According to another aspect of the disclosure, a computer program product resides on a computer readable storage medium and has a plurality of instructions stored on it. When executed by a processor, the instructions cause the processor to perform operations including mapping one or more software developers to one or more software code elements. The operations further include determining one or more expert rankings of the one or more software developers with respect to the one or more software code elements. The operations further include identifying one or more current code elements associated with an active software developer. The operations further include receiving, from the active software developer, a request for assistance from an expert. The operations further include identifying one or more potential experts based upon, at least in part, the one or more current code elements and the one or more expert rankings.

One or more of the following features may be included. Determining the one or more expert rankings may be based upon, at least in part, one or more of a number of code deliveries associated with the one or more software developers, a change in code complexity associated with the one or more software developers, a code quality change associated with the one or more software developers, a persistence of a code change associated with the one or more software developers, and a peer assessment associated with the one or more software developers. The one or more current code elements may be identified based upon, at least in part, a change frequency associated with one or more code elements. The one or more current code elements may be identified based upon, at least in part, receiving a threshold number of related inputs. The one or more current code elements may be identified based upon, at least in part, an amount of time one or more code elements form part of an active view. The one or more current code elements may be identified based upon, at least in part, a time-limited analysis.

Identifying the one or more potential experts may be based upon, at least in part, aggregating rankings associated with a plurality of the one or more current code elements. Identifying the one or more potential experts may be based upon, at least in part, one or more geographical locations associated with the one or more software developers, one or more time zones associated with the one or more software developers, one or more online statuses associated with the one or more software developers, and one or more calendar entries associated with the one or more software developers.

According to another aspect of the disclosure, a computing system includes one or more processor and one or more memory architecture coupled with the at one or more processors. The one or more processors are configured to map one or more software developers to one or more software code elements. The one or more processors are configured to determine one or more expert rankings of the one or more software developers with respect to the one or more software code elements. The one or more processors are configured to identify one or more current code elements associated with an active software developer. The one or more processors are configured to receive, from the active software developer, a request for assistance from an expert. The one or more processors are configured to identify one or more potential experts based upon, at least in part, the one or more current code elements and the one or more expert rankings.

One or more of the following features may be included. Determining the one or more expert rankings may be based upon, at least in part, one or more of a number of code deliveries associated with the one or more software developers, a change in code complexity associated with the one or more software developers, a code quality change associated with the one or more software developers, a persistence of a code change associated with the one or more software developers, and a peer assessment associated with the one or more software developers. The one or more current code elements may be identified based upon, at least in part, a change frequency associated with one or more code elements. The one or more current code elements may be identified based upon, at least in part, receiving a threshold number of related inputs. The one or more current code elements may be identified based upon, at least in part, an amount of time one or more code elements form part of an active view.

Identifying the one or more potential experts may be based upon, at least in part, one or more geographical locations associated with the one or more software developers, one or more time zones associated with the one or more software developers, one or more online statuses associated with the one or more software developers, and one or more calendar entries associated with the one or more software developers.

According to one aspect of the disclosure, a computer-implemented method includes mapping, by one or more computing devices, one or more software developers to one or more software code elements. The method further includes determining, by the one or more computing devices, one or more expert rankings of the one or more software developers with respect to the one or more software code elements. The method further includes identifying, by the one or more computing devices, one or more current code elements associated with an active software developer. The method further includes identifying, by the one or more computing devices, a need for assistance from an expert, wherein the need for assistance is associated with the active software developer and the one or more current code elements. The method further includes identifying, by the one or more computing devices, one or more potential experts based upon, at least in part, the one or more current code elements and the one or more expert rankings.

One or more of the following features may be included. Identifying the need for assistance may be based upon, at least in part, one or more of an amount of time since the active software developer last edited the one or more current code elements, a repeating pattern of activity associated with the active software developer, and an expert ranking associated with the active software developer.

According to one aspect of the disclosure, a computer-implemented method includes mapping, by one or more computing devices, one or more software developers to one or more software code elements. The method further includes determining, by the one or more computing devices, one or more expert rankings of the one or more software developers with respect to the one or more software code elements. The method further includes identifying, by the one or more computing devices, one or more current code elements associated with an active software developer. The method further includes receiving, by the one or more computing devices, from the active software developer, a request for assistance from an expert. The method further includes identifying, by the one or more computing devices, one or more potential experts based upon, at least in part, the one or more current code elements and the one or more expert rankings. The method further includes providing, by the one or more computing devices, to the active software developer, contact information for the one or more potential experts. The method further includes receiving, by the one or more computing devices, from the active software developer, feedback regarding the one or more potential experts. The method further includes updating, by the one or more computing devices, the one or more expert rankings based upon, at least in part, the feedback.

The details of one or more implementations are set forth in the accompanying drawings and the description below. Other features and advantages will become apparent from the description, the drawings, and the claims.

BRIEF DESCRIPTION OF THE SEVERAL VIEWS OF THE DRAWINGS

Like reference symbols in the various drawings indicate like elements.

DETAILED DESCRIPTION OF THE PREFERRED EMBODIMENTS

Figure 1:
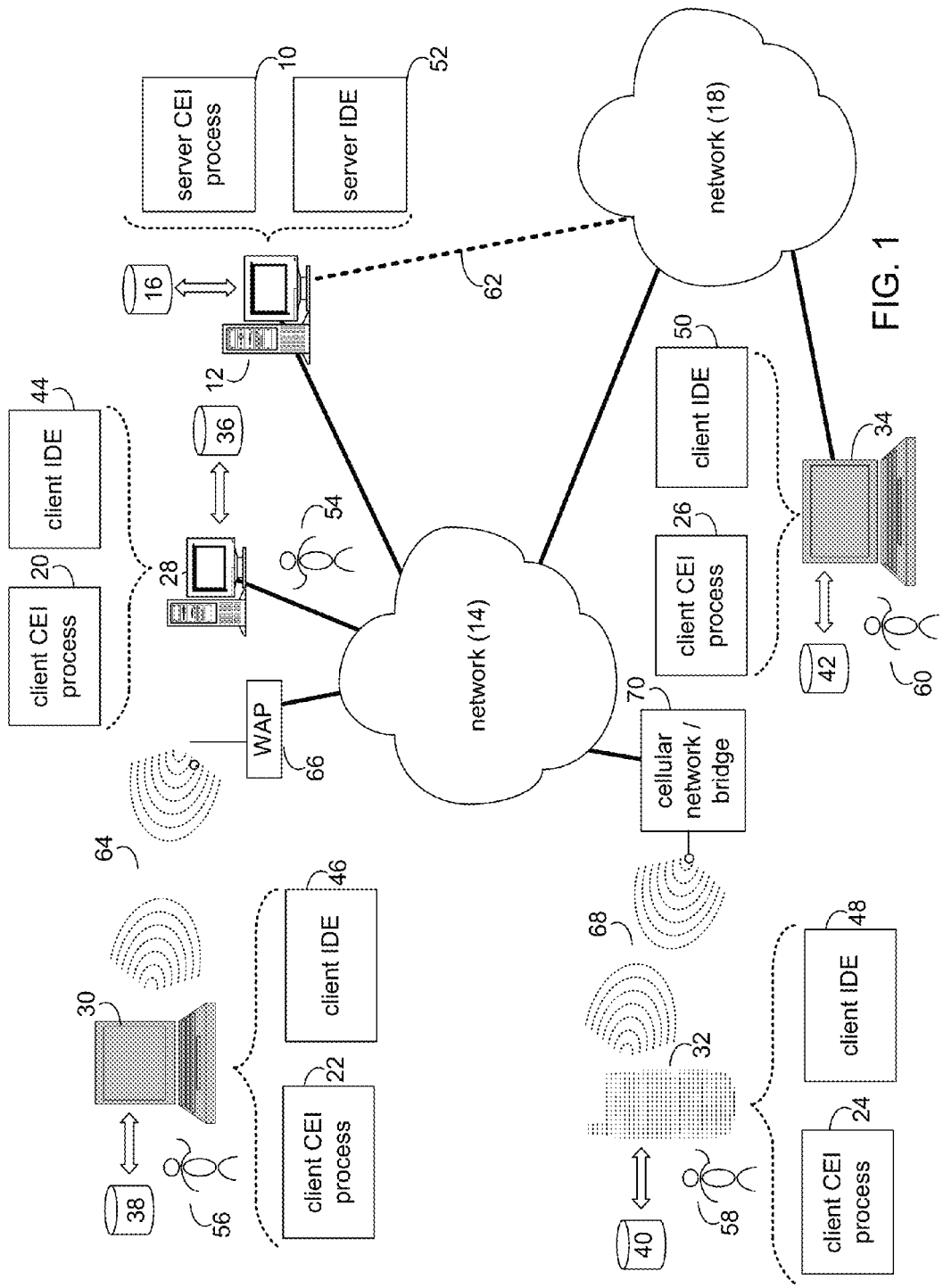
FIG. 1 is a diagrammatic view of a code expert identification process coupled to a distributed computing network.

As will be appreciated by one skilled in the art, the present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product on a computer-usable storage medium having computer-usable program code embodied in the medium.

Any suitable computer usable or computer readable medium may be utilized. The computer usable medium may be a computer readable signal medium or a computer readable storage medium. A computer-usable, or computer-readable, storage medium (including a storage device associated with a computing device or client electronic device) may be, for example, but not limited to, an electronic, magnetic, optical, electromagnetic, infrared, or semiconductor system, apparatus, or device, or any suitable combination of the foregoing. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device. In the context of this document, a computer-usable, or computer-readable, storage medium may be any tangible medium that can contain, or store a program for use by or in connection with the instruction execution system, apparatus, or device.

A computer readable signal medium may include a propagated data signal with computer readable program coded embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations of the present invention may be written in an object oriented programming language such as Java, Smalltalk, C++ or the like.

However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

In efforts to develop software code, individuals may develop various levels of software expertise with regard, for example, to software code languages, software code conventions and structure, software code functionality with regard so various parameters, and so on. Such expertise may relate to various aspects of software code in general, as well as various aspects of specific implementations of software code. For example, within a group software development environment—as may be facilitated for example using various known techniques of source control, version control and/or other types of code development controls—particular developers may be come to embody particular expertise with regard to particular portions of the software code. In certain embodiments, individuals may develop expertise with regard to particular software structures, objects, classes, components, blocks of code, and various other software code elements.

In certain instances, programmers may experience difficulties with respect to aspects of code development. For example, programmers may be unable to efficiently advance code development (or achieve other software-related goals) because they lack appropriate expertise regarding various aspects of particular and/or general code structures, object definitions, blocks of code, classes, class instances, and other software code elements. Such programmers, however, may not be aware of particular other programmers that may be available to provide relevant expertise regarding these elements.

A Code Expert Identification ("CEI") process may address these and other issues. In certain embodiments, a CEI process may associate various software developers with various software code elements as experts regarding those elements. A CEI process may, in certain embodiments, associate a set of software code developers with a particular software code element in a ranked or otherwise scored fashion (e.g., as experts of varying rank) and may maintain a record of such association and/or ranking. A CEI process may, in certain embodiments, identify instances in which other (or the same) software developers are experiencing difficulties with respect to certain software code elements (e.g., because they are new to a particular area of a software product, the documentation associated with the code element is poor, and so on). In certain embodiments, a CEI process may, based on those identified difficulties and a record of associated experts (e.g., as described above), facilitate communication between the developers experiencing difficulties and one or more appropriate experts.

Referring now to FIG. 1, a CEI process may be coupled to a computer or computer network. For example, server CEI process 10 may reside on and may be executed by server computer 12, which may be connected to network 14 (e.g., the Internet or a local area network). Examples of server computer 12 may include, but are not limited to: a personal computer, a server computer, a series of server computers, a mini computer, and/or a mainframe computer. Server computer 12 may be a web server (or a series of servers) running a network operating system, examples of which may include but are not limited to: Microsoft® Windows Server®; Novell® Netware®; or Red Hat® Linux®, for example. (Microsoft and Windows are registered trademarks of Microsoft Corporation in the United States, other countries or both; Novell and NetWare are registered trademarks of Novell Corporation in the United States, other countries or both; Red Hat is a registered trademark of Red Hat Corporation in the United States, other countries or both; and Linux is a registered trademark of Linus Torvalds in the United States, other countries or both.)

The instruction sets and subroutines of server CEI process 10, which may be stored on storage device 16 coupled to server computer 12, may be executed by one or more processors (not shown) and one or more memory architectures (not shown) incorporated into server computer 12. Storage device 16 may include but is not limited to: a hard disk drive; a tape drive; an optical drive; a RAID array; a random access memory (RAM); and a read-only memory (ROM).

Server computer 12 may execute a web server application, examples of which may include but are not limited to: Microsoft® IIS, Novell® Web Server™, or Apache® Web Server, that allows for access to server computer 12 (via network 14) using one or more protocols, examples of which may include but are not limited to HTTP (i.e., HyperText Transfer Protocol), SIP (i.e., session initiation protocol), and the Lotus® Sametime® VP protocol. (Webserver is a trademark of Novell Corporation in the United States, other countries, or both; Apache is a registered trademarks of Apache Software Foundation in the United States, other countries, or both; Lotus and Sametime are registered trademarks of International Business Machine Corp. in the United States, other countries, or both.) Network 14 may be connected to one or more secondary networks (e.g., network 18), examples of which may include but are not limited to: a local area network; a wide area network; or an intranet, for example.

Client CEI processes 20, 22, 24, 26 may reside on and may be executed by client electronic devices 28, 30, 32, and/or 34 (respectively), examples of which may include but are not limited to personal computer 28, laptop computer 30, a data-enabled mobile telephone 32, notebook computer 34, personal digital assistant (not shown), smart phone (not shown) and a dedicated network device (not shown), for example. Client electronic devices 28, 30, 32, 34 may each be coupled to network 14 and/or network 18 and may each execute an operating system, examples of which may include but are not limited to Microsoft® Windows®, Microsoft Windows CE®, Red Hat® Linux®, or a custom operating system.

The instruction sets and subroutines of client CEI processes 20, 22, 24, 26, which may be stored on storage devices 36, 38, 40, 42 (respectively) coupled to client electronic devices 28, 30, 32, 34 (respectively), may be executed by one or more processors (not shown) and one or more memory architectures (not shown) incorporated into client electronic devices 28, 30, 32, 34 (respectively). Storage devices 36, 38, 40, 42 may include but are not limited to: hard disk drives; tape drives; optical drives; RAID arrays; random access memories (RAM); read-only memories (ROM); compact flash (CF) storage devices; secure digital (SD) storage devices; and memory stick storage devices.

In an embodiment, the CEI process may be a server-side process (e.g., which may be implemented via server CEI process 10), in which all of the functionality of the CEI process may be executed on a server computer (e.g., server computer 12). In an embodiment, the CEI process may be a client-side process (e.g., which may be implemented via one or more of client CEI processes 20, 22, 24, 26), in which all of the functionality of the CEI process may be executed on a client computing device (e.g., one or more of client electronic devices 28, 30, 32, 34). In an embodiment, the CEI process may be a hybrid server-client process (e.g., which may be implemented by server CEI process 10 and one or more of client CEI processes 20, 22, 24, 26), in which at least a portion of the functionality of the CEI process may be implemented via server computer 12 and at least a portion of the functionality of the CEI process may be implemented via one or more client computing devices (e.g., one or more of client electronic devices 28, 30, 32, 34).

In certain embodiments, a CEI process may be a stand-alone process. In certain embodiments, a CEI process may operate as part of, or in conjunction with, one or more other processes and/or may include one or more other processes.

An integrated development environment ("IDE") may be an application and/or process operating (and/or residing) on a client device (e.g., client IDE 44, operating on client electronic device 28; client IDE 46, operating on client electronic device 30; client IDE 48, operating on client electronic device 32; or client IDE 50, operating on client electronic device 34). A client CEI process (e.g., client CEI process 20) or a server CEI process (e.g., server CEI process 10) may be in communication with a client IDE (e.g., client IDE 44) or may be part of a client IDE.

An IDE may additionally or alternatively operate (and/or reside) on a server device (e.g., server IDE 52, operating on server computer 12 or another server IDE (not shown), operating on another server computer (not shown)). A server CEI process (e.g., server CEI process 10) or a client CEI process (e.g., client CEI process 20) may be in communication with a server IDE (e.g., server IDE 52) or may be a part of a server IDE.

An IDE may be an application or process that facilitates software code development in various known ways. In certain embodiments, an IDE may operate with various source control (or version control) management processes and systems. For example, an IDE may be in communication with source control repositories and other software code storage systems. IDE's may vary among individuals and organizations and may include various types of functionality.

Users 54, 56, 58, 60 may access a CEI process in various ways. For example, these users may access server CEI process 10 directly through the device on which a client process (e.g., client CEI processes 20, 22, 24, 26) is executed, namely client electronic devices 28, 30, 32, 34. Users 54, 56, 58, 60 may access server CEI process 10 directly through network 14 and/or through secondary network 18. Further, server computer 12 (i.e., the computer that executes server CEI process 10) may be connected to network 14 through secondary network 18, as illustrated with phantom link line 62. Users 54, 56, 58, 60 may also access a client or server IDE in similar ways.

The various client electronic devices may be directly or indirectly coupled to network 14 (or network 18). For example, personal computer 28 is shown directly coupled to network 14 via a hardwired network connection. Further, notebook computer 34 is shown directly coupled to secondary network 18 via a hardwired network connection. Laptop computer 30 is shown wirelessly coupled to network 14 via wireless communication channel 64 established between laptop computer 30 and wireless access point ("WAP") 66, which is shown directly coupled to network 14. WAP 66 may be, for example, an IEEE 802.11a, 802.11b, 802.11g, 802.11n, Wi-Fi, and/or Bluetooth device that is capable of establishing wireless communication channel 64 between laptop computer 30 and WAP 66. Data-enabled mobile telephone 32 is shown wirelessly coupled to network 14 via wireless communication channel 68 established between data-enabled mobile telephone 32 and cellular network/bridge 70, which is shown directly coupled to network 14.

As is known in the art, all of the IEEE 802.11x specifications may use Ethernet protocol and carrier sense multiple access with collision avoidance (i.e., CSMA/IDE) for path sharing. The various 802.11x specifications may use phase-shift keying (i.e., PSK) modulation or complementary code keying (i.e., CCK) modulation, for example. As is known in the art, Bluetooth is a telecommunications industry specification that allows e.g., mobile phones, computers, and personal digital assistants to be interconnected using a short-range wireless connection.

For the following discussion, client CEI process 20 will be described for illustrative purposes. It will be understood that client CEI process 20 may, for example, interact and/or communicate with a server CEI process such as server CEI process 10 and/or may be executed within one or more applications that allow for communication with other server and/or client CEI processes. This is not intended to be a limitation of this disclosure, as other configurations are possible (e.g., CEI process 20 may include stand-alone client processes and/or stand-alone server processes). For example, some implementations may include one or more of client CEI processes 22, 24, 26 or server CEI process 10 in place of or in addition to client CEI process 20.

Figure 2:
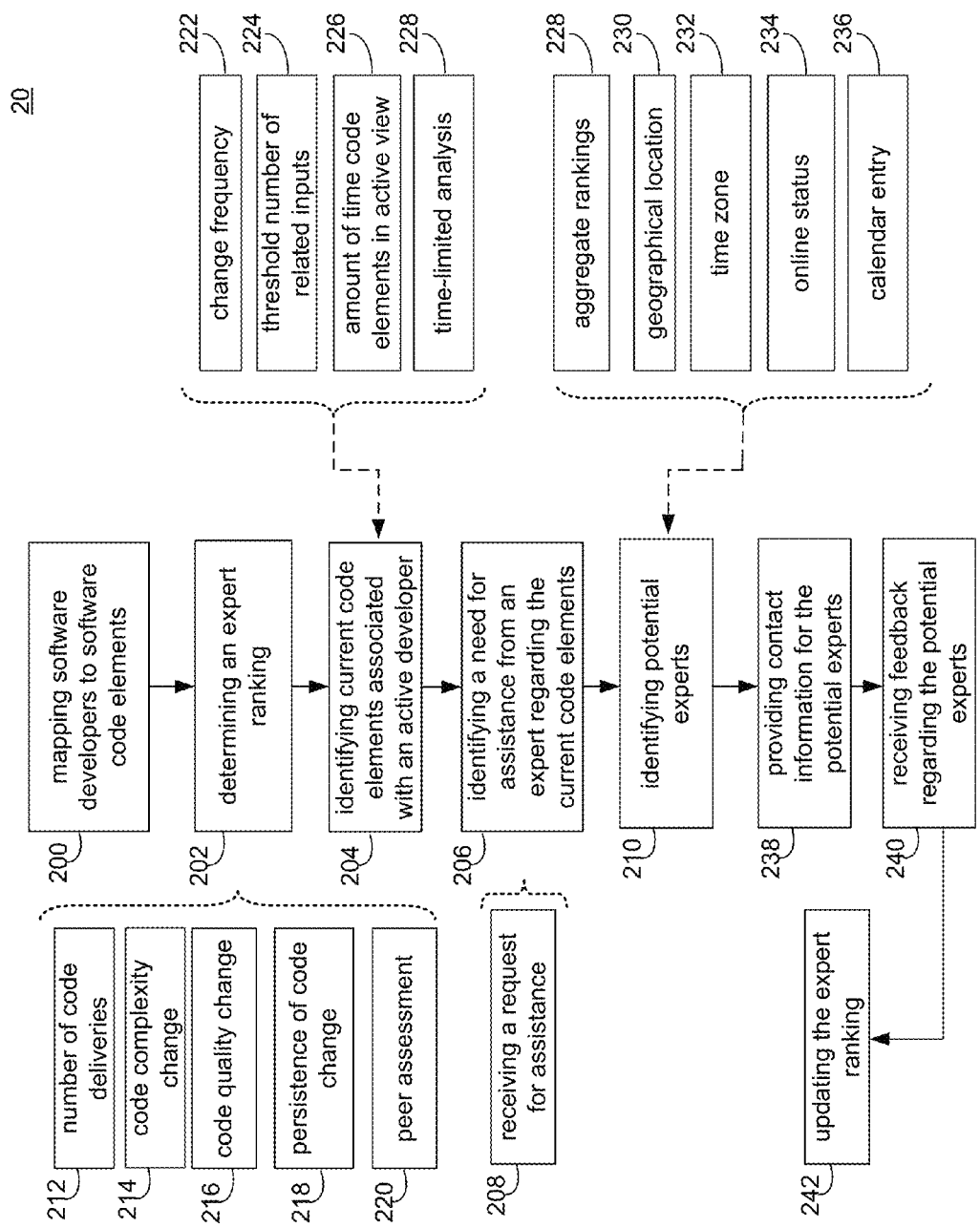
FIG. 2 is a flowchart of a process executed by the code expert identification process of FIG. 1.

Referring now also to FIG. 2, there is shown a diagrammatic view of an example process that may be implemented by a CEI process, e.g., client CEI process 20. Client CEI process 20 may map 200 one or more software developers to one or more software code elements. As noted above, a software code element may be a portion of software code of various types. For example, code elements may include blocks of code, packages, objects, classes, entire components, and so on. In order to map 200 software developers to a particular software code element (and/or element type), CEI process may identify various software developers that are associated with a particular software code element (and or element type). For example, CEI process may identify software developers that have spent a certain amount of time working on a particular element software code element, software developers designated as experts for that element (e.g., based on administrator or peer input), software developers who have provided a certain number (or percentage) of lines of code associated with that element, software developers whose code has remained part of that element for certain amounts of time (or percentage of the element's lifetime), software developers whose code associated with that element has been rated at a particular level, software developers of certain proficiency who have contributed to that element, and so on. CEI process may map such identified developers to relevant software code elements in various ways.

CEI process 20 may determine 202 one or more expert rankings of the mapped 200 software developers with respect to the software code elements. In certain embodiments, determining 202 expert ranking for the mapped 200 developers may be useful, for example, in order to facilitate identifying a developer with appropriate expertise to assist another developer who is having difficulties with a particular code element. As will be discussed in greater detail below, CEI process 20 may determine 202 expert rankings based on a variety of factors.

CEI process 20 may identify 204 one or more current code elements associated with an active software developer (i.e., a software developer who is currently engaged with software development). A current code element may be a code element that a particular developer (or developers) has checked out, is currently viewing and/or is currently working on, and so on. For example, a current code element may be a software code element that a developer has checked out from a version control system (and/or a portion thereof) and/or may be a software code element that a developer is actively editing. In certain embodiments, CEI process 20 may identify 204 a single current code element for a particular developer. In certain embodiments, CEI process 20 may identify 204 multiple current code elements for a particular developer (including, for example, code elements of various types).

As will be discussed in greater detail below, CEI process may identify 204 a current code element using a variety of techniques. For example, in certain embodiments, CEI process may determine that a particular developer is currently (or has recently) made edits of particular substance, size and so on, to a software code element and that, accordingly, such software code element may be appropriately identified 204 as a current code element.

CEI process 20 may identify 206 an active software developer's need for assistance from an expert. In certain embodiments, the need for assistance may be associated with one or more current code elements that have been identified 204 as associated with the active developer. For example, CEI process 20 may determine that a particular developer is currently editing a particular code element (i.e., a current code element) and may determine that the developer is experiencing difficulties of various sorts with the development. Based upon these determinations, CEI process 20 may identify 206 that the developer would appreciate (or otherwise needs) assistance from another developer with greater expertise regarding the particular code element. As will be discussed in greater detail below, CEI process 20 may identify 206 a need for assistance in a variety of ways.

In certain embodiments, CEI process 20 may identify 206 a need for assistance from an expert based upon, at least in part, receiving 208 from the active software developer a request for assistance from the expert. For example, in certain embodiments CEI process 20 may receive a direct input from a developer indicating that the developer would like to receive assistance from an expert. For example, a developer may execute a gesture or select a particular action button to indicate that he is experiencing difficulties with respect to the code element he is currently editing. In certain embodiments, such direct input may include a designation of a particular code element with regard to which the developer desires assistance.

CEI process 20 may identify 210 one or more experts that may potentially assist a developer with an identified 206 need for assistance. CEI process 20 may identify experts, for example, based upon, at least in part, the identified 204 current code elements and the determined 202 expert rankings. For example, CEI process 20 may identify 210 a particular code developer as a potential expert based upon determining that the particular code developer has a high expert ranking with respect to a current code element with respect to which another developer may be experiencing difficulties. In certain embodiments CEI process 20 may identify 210 a potential expert based on expert ranking as well as other factors, such as proximity of a potential expert to the developer in need, availability of the potential expert and/or willingness of the potential expert to help, and so on.

As also noted above, determining 202 expert rankings may be based upon a variety of factors. In certain embodiments, determining 202 expert rankings may be based upon, at least in part, number of code deliveries 212 associated with one or more software developers. For example, if a developer is associated with a large number of code deliveries (and/or large number of high quality code deliveries, and so on) with respect to a particular code element (or elements), CEI process 20 may determine a high (i.e., favorable) expert ranking for that developer.

In certain embodiments, determining 202 expert rankings may be based upon, at least in part, changes in code complexity 214 associated with one or more software developers. For example, based on various known techniques (e.g., static analysis of code complexity), CEI process 20 may determine a change, between various code deliveries, in the complexity of certain code elements, wherein the change may be associated with a particular developer. CEI process 20 may base determining 202 expert rankings on such a change in complexity 214.

In certain embodiments, determining 202 expert rankings may be based upon, at least in part, code quality change 216 associated with one or more software developers. For example, based on various known techniques (e.g., static analysis of code quality), CEI process 20 may determine a change, between various code deliveries, in the quality of certain code elements, wherein the change may be associated with a particular developer. CEI process 20 may base determining 202 expert rankings on such a change in quality 216.

In certain embodiments, determining 202 expert rankings may be based upon, at least in part, persistence of a code change 218 associated with one or more software developers. For example, a change to a code element that was implemented by a particular developer may be determined to be persistent if the code change remains a part of the code element for a certain measure of time (or a certain percentage of the code element's lifetime). For example, if a code change remains part of a code through several versions of the code, the code change may be determined to be particularly persistent. CEI process 20 may base determining 202 expert rankings on such a persistence.

In certain embodiments, determining 202 expert rankings may be based upon, at least in part, peer assessment 220 associated with one or more software developers. In certain embodiments, CEI process 20 may receive from other developers (and/or administrators) information regarding the work quality, expertise, reliability, and so on of a particular software code developer. In certain embodiments, such information may relate to a particular code element and/or may be information regarding the developer's general expertise, and so on. CEI process 20 may determine 202 expert rankings based upon such assessments 220 received from such peers.

As also noted above, identifying 204 a current code element may be based upon a variety of factors. For example, in certain embodiments, identifying 204 current code elements may be based upon, at least in part, change frequency 222 associated with one or more code elements. Change frequency 222 may be a measure of a rate or frequency with which a developer has changed (or is changing) a particular code element (or a portion thereof). Because a current code element may be an element currently being edited by a developer, the frequency with which a developer is changing an element may indicate, at least in part, whether that element should be identified 204 as a current code element.

Identifying 204 current code elements may be based upon, at least in part, receiving threshold number 224 of related inputs. For example, in certain embodiments a number of mouse clicks (or other input actions) associated with a code element may indicate that a developer is actively editing that code element. For example, in certain IDEs a developer may select a method with a mouse (i.e., may "click" the method) in order to see the associated method definition. Frequent such selections (i.e., "clicks") may indicate that the developer is editing the method and that the method should therefore be identified 204 as a current code element.

Identifying 204 current code elements may be based upon, at least in part, amount of time 226 code elements form part of an active view. In certain embodiments, the amount of software code immediately visible to a developer within an IDE (i.e., the amount of software code in an active view) may be limited (e.g., by screen size or other considerations). As such, if a particular code element has been part of an active view for a substantial amount of time 226, this may indicate that the developer is actively engaged with that code element and that the element should therefore be identified 204 as a current code element.

Identifying 204 current code elements may be based upon, at least in part, time-limited analysis 228. In certain embodiments, it may be useful to identify 204 as current code elements only elements that have been actively engaged with by a developer within a particular time period. For example, it may be useful to identify 204 as current code elements only elements that have been actively edited by a developer during the previous five minutes. CEI process 20 may accordingly identify 204 current code elements based upon parameters limited to the previous five minutes and/or other time periods (i.e., may employ a time-limited analysis 228).

It will be understood that various aspects of identifying 204 current code elements (and/or other processes or functionality of CEI process 20) may be implemented separately or in various combinations. It will further be understood that identifying 204 current code elements may include analysis of various patterns of IDE use (e.g., the order, timing, and so on in which the various aspects described above occur). For example, CEI process 20 may identify 204 code elements and/or identify 206 a need for assistance based on various patterns of IDE activity, such as a developer looking through same code over and over without making changes, making changes then repeatedly clicking on a method to check the method definition, making then unmaking changes repeatedly, and so on.

As also noted above, identifying 210 a potential expert may be based upon a variety of factors. For example, identifying 210 a potential expert may be based upon, at least in part, aggregate rankings 228 associated with a plurality of one or more current code elements. For example, in certain embodiments a developer may need assistance with regard to multiple code elements. For example, a developer may be experiencing difficulty with regard to a set of related (or otherwise associated) code elements. In such a scenario, another code developer may be able to provide useful and efficient expert assistance if his expertise relates to several of the multiple related code elements. As such, for example, CEI process 20 may determine 202 rankings associated with various code developers based on identifying expertise for particular developers with regard to multiple code elements (i.e., may determine 202 aggregate rankings 228). For example, in certain embodiments assistance may be needed with regard to three code elements. In such a scenario, three separate developers may have been determined 202 as the first-ranked expert regarding, respectively, the three code elements, and a fourth developer may have been determined 202 as the second-ranked expert for all three code elements. As such, CEI may determine 202 that the fourth developer has a better aggregate ranking 228 than the other three developers with respect to the three code elements regarding which assistance may be needed.

Identifying 210 a potential expert may be based upon, at least in part, geographical location 230 associated with a potential expert. In certain embodiments, it may be useful to identify 210 experts who are within the same geographic area as a developer who needs assistance. For example, variation in speech patterns inherent to particular geographical areas may result in more efficient sharing of expertise among individuals that live in the same area (i.e., among individuals who share a particular speech pattern). Similarly, if personal meetings may be appropriate for expertise delivery, it may be useful to identify 210 potential experts who are located relatively close to the developer needing assistance.

Identifying 210 a potential expert may be based upon, at least in part, time zone 232 associated with a potential expert. In certain embodiments, for example, an identified 206 need for assistance may be immediate. For example, a developer may be unable to progress development of a particular code element until she has received assistance from an appropriate expert. In such a case, for example, it may be useful to identify 210 an expert who may be operating on a similar work schedule as the developer in need of assistance (i.e., an expert who may be available to provide assistance while the developer is actually working on the code element). In certain embodiments, for example, this may be facilitated by identifying 210 experts who are located in the same time zone as the developer (and/or a nearby time zone).

Identifying 210 a potential expert may be based upon, at least in part, online status 234 associated with a potential expert. As also noted above, it may be useful in certain embodiments to identify 210 potential experts who may be immediately available to provide assistance. Developers (and other individuals) may sometimes indicate a particular availability via an online status 234. For example a status associated with an instant messaging program, a social networking application, a video-call application, and so on, may indicate that a potential expert is currently available for communication, is currently unavailable for communication, will not be available for communication for the next two hours, and so on. Accordingly, in certain embodiments, online status 234 of a developer may indicate whether the developer may be able to provide expert assistance at a particular time.

Identifying 210 a potential expert may be based upon, at least in part, calendar entry 236 associated with a potential expert. Again, as also noted above, it may be useful in certain embodiments to identify 210 potential experts who may be immediately available to provide assistance. CEI process 20 may identify 210 such potential experts, for example, based upon analysis of calendar entries to determine whether an expert is currently (or will be) engaged with an activity that may prevent the expert from providing assistance. For example, CEI process 20 may determine that one potential expert just started a four-hour meeting, whereas another potential expert has no appointments on her calendar for an entire afternoon. In such a case, CEI process 20 may identify 210 the expert with the free afternoon as a useful potential expert, but may pass over the expert in the meeting.

CEI process 20 may provide 238 contact information for an identified 210 potential expert to the active software developer. In certain embodiments, it may be useful to facilitate communication between a developer in need of assistance and an identified 210 potential expert. Accordingly, for example, CEI process 20 may provide 238 contact information for various experts to a developer so that the developer may easily contact those experts for assistance. In certain embodiments, CEI process 20 may provide 238 expert contact (and/or) information to a developer along with information regarding the determined 202 ranking of those experts. This may, for example, facilitate a developer selecting an appropriate expert (or experts) to contact. In certain embodiments, CEI process 20 may provide 238 contact information and/or may automatically facilitate establishing a communication connection between a developer and an expert. For example, CEI process 20 may automatically call a selected expert from a developer's phone in order to facilitate the developer receiving assistance from that expert.

CEI process 20 may receive 240 feedback regarding an identified 210 potential expert from the active software developer. For example, in order to facilitate more accurate determination 202 of expert rankings, it may be useful to receive 240 feedback of various types regarding the assistance provided by an identified 210 expert to a developer with an identified 206 need. For example, in certain embodiments a developer may feel that he received poor quality assistance from a highly ranked expert and/or high quality assistance from a lower-ranked expert. In such a scenario, for example, it may be appropriate to refine determined 202 rankings based on the developer's assessment of the quality of the assistance (i.e., to lower the ranking of the higher-ranked expert and/or raise the ranking of the lower-ranked expert). As such, CEI process 20 may receive 240 feedback regarding the developer's experience in receiving assistance and may update 242 the determined 202 expert rankings associated with relevant experts based upon, at least in part, the received 240 feedback.

Figure 3:
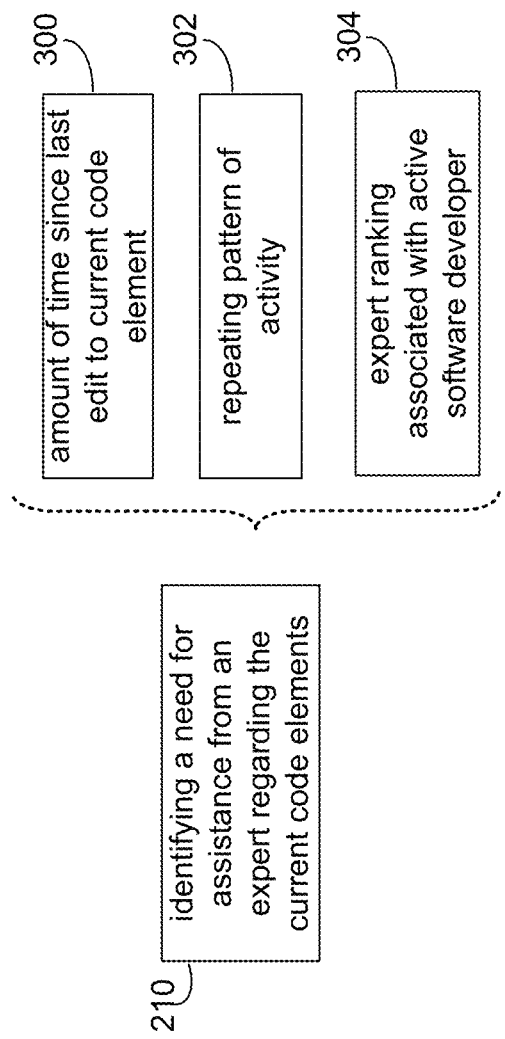
FIG. 3 is a flowchart of a process executed by the code expert identification process of FIG. 1.

As noted above, CEI process 20 may identify 206 a need for assistance from an expert regarding current code elements. As also noted above, in certain embodiments, identifying 206 a need for assistance may be based upon receiving 208 a request from an active software developer for assistance. In certain embodiments, identifying 206 a need for assistance may additionally/alternatively occur automatically, in whole or in part. For example, referring now also to FIG. 3, in certain embodiments CEI process 20 may identify 206 a need for assistance from an expert based upon, at least in part, amount of time 300 since the active software developer last edited the identified 204 current code elements. For example, if an active software developer has maintained a code element (or various portions of a code element) in an active view for a particularly long amount of time without making edits, CEI process 20 may determine that the developer is experiencing difficulty in identifying and/or composing appropriate changes to the code element (and/or related code elements). In certain, CEI process 20 may identify 206 a need for assistance based upon this determination.

In certain embodiments, CEI process 20 may identify 206 a need for assistance from an expert based upon, at least in part, repeating pattern of activity 302 associated with the active software developer. For example, if an active developer engages in a pattern of repeated mouse clicks, reference searches, scrolling behavior, and so on, CEI process 20 may determine that the developer is unsure of an appropriate next step with regarding to development of a particular software element. In other words, in certain embodiments, repeating patterns of activity 302 may indicate that a developer is going around in circles with respect to a particular software element, without making meaningful development progress. As such, for example, it may be useful for CEI process 20 to identify such patterns of activity 302 as a basis for identifying 206 a need for assistance.

In certain embodiments, CEI process 20 may identify 206 a need for assistance from an expert based upon, at least in part, expert ranking 304 associated with the active software developer. For example, CEI process 20 may determine that an active developer has a low level of expertise with regard to one or more software elements that the developer is currently attempting to edit. This may indicate, in certain embodiments, alone or in combination with other indicators (as described above, for example) that the developer may need assistance with regard to development of those software elements. Accordingly, it may be useful for CEI process 20 to identify a need for assistance based upon, at least in part, an expert ranking 304 associated with the developer needing assistance.

Figure 4:
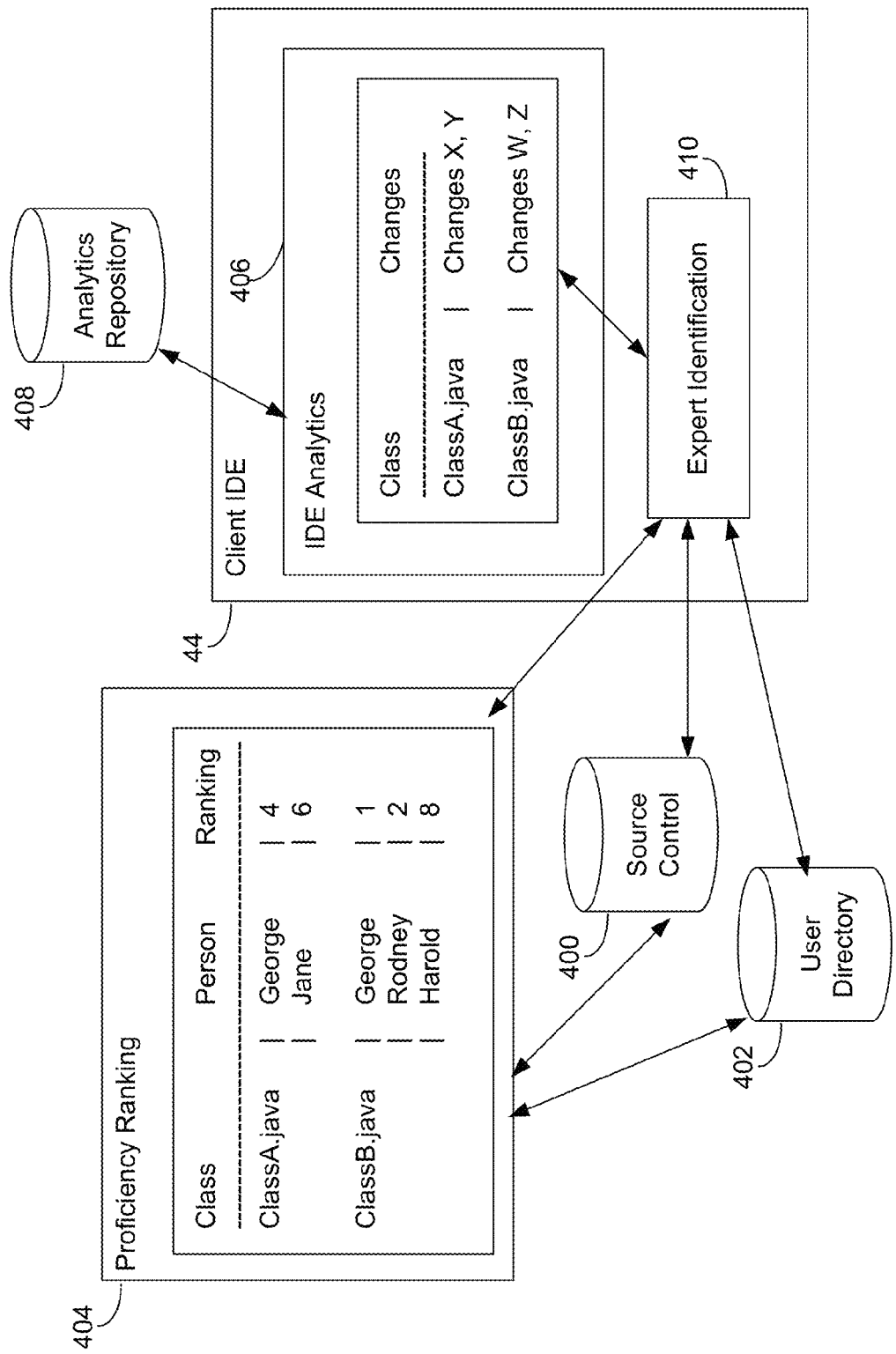
FIG. 4 is a diagrammatic view of an implementation of the code expert identification process of FIG. 1.

Referring now also to FIG. 4, a diagrammatic view of an aspect of CEI process 20 is presented. In certain embodiments, CEI process 20 may operate as part of a code management system including, for example, source control repository 400, user directory 402, client IDE 44, and so on. In certain embodiments, CEI process 20 may operate as a number of modules which may reside together or separately. For example, Proficiency Ranking module 404, which may be part of client IDE 44 or another application or process, may facilitate determining 202 expert rankings with regard to various code elements. Proficiency Ranking module 404 may determine various rankings for software developers (e.g., developers George, Jane, Rodney, and Harold) with respect to various software code elements (e.g., Java classes, ClassA.java and ClassB.java). For example, by analyzing information contained within source code repository 400 Proficiency Ranking module 404 may identify number of code deliveries 212, code complexity changes 214, code quality changes 216, persistence of code changes 218, peer assessments 220, and so on associated with developers George, Jane, Rodney, and Harold with respect to ClassA.java and ClassB.java. This information may, for example, facilitate Proficiency Ranking module 404 determining 202 expert rankings regarding these programmers. In certain embodiments (e.g., if both ClassA.java and ClassB.java are relevant to the identified 204 current code elements) Proficiency Ranking module 404 may determine aggregate rankings 228. For example, Proficiency Ranking module 404 may determine that George has a higher aggregate ranking 228 than Jane, Rodney or Harold because George is a highly ranked expert with regard to both of the relevant Classes whereas the other developers are not.

In certain embodiments, IDE Analytics module 408 may, for example, be part of client IDE 44 and may, for example, facilitate identifying 204 one or more current code elements associated with an active software developer, identifying 206 a need for assistance from an expert, and/or other executing other functionality. IDE Analytics module 408 may be in communication, for example, with Analytics Repository 408 which may, for example, store various records relevant to identifying 204 one or more current code elements associated with an active software developer and/or identifying 206 a need for assistance from an expert. For example, Analytics Repository 408 (which may be part of client IDE 44 and/or separate from client IDE 44) may include information regarding change frequencies 222, numbers of related inputs 224, amounts of time 226 code elements are in an active view, and so on. In certain embodiments, for example, based upon information from Analytics Repository 408, IDE Analytics module 406 may determine that a particular developer has made particular changes (e.g., changes X, Y, W, and Z) to particular code elements (e.g., classes ClassA.java and ClassB.java), which may facilitate identifying 204 certain of those code elements as current code elements.

In certain embodiments, Expert Identification module 410 may, for example, be part of client IDE 44 and may, for example, facilitate identifying 210 potential experts based upon information associated with Proficiency Ranking module 404 and IDE Analytics module 406. For example, Expert Identification module 410 may be in communication with IDE Analytics module 406 to determine an identified 204 current code element and/or may be in communication with Proficiency Ranking module 404 to identify 210 potential experts associated with the identified 204 current code element. For example, if ClassA.java is identified 204 as a current code element, Expert Identification module 410 may identify 210, based on information from Proficiency Ranking module 404, developers George and Jane as potential experts.

In order to facilitate, for example, providing 238 contact information, one or more of the modules (e.g., Expert Identification module 410 and/or Proficiency Ranking module 404) may be in communication with user directory 402. One or more of the modules may similarly be in communication with one or more other data repositories, applications, processes and so on (not shown). For example, in order to identify 210 a potential expert based upon online status 234 and calendar entry 236, Expert Identification module 410 may be in communication with an online communication application (not shown) and a calendar application (not shown).

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

A number of embodiments and implementations have been described. Nevertheless, it will be understood that various modifications may be made. Accordingly, other embodiments and implementations are within the scope of the following claims.

What is claimed is:

1. A computer program product residing on a non-transitory computer-readable storage medium having a plurality of instructions stored thereon, which, when executed by a processor, cause the processor to perform operations comprising:
   mapping one or more software developers to one or more software code elements;
   determining one or more expert rankings of the one or more software developers with respect to the one or more software code elements;
   identifying one or more current code elements associated with an active software developer;
   determining an amount of time that at least one current code element of the one or more current code elements forms part of an active view;
   determining, automatically, a need for an expert with the at least one current code element based upon, at least in part, the amount of time that the at least one current code element is in the active view;
   receiving, from the active software developer, a request for assistance from the expert; and
   identifying one or more potential experts based upon, at least in part, the one or more current code elements and the one or more expert rankings.

2. The computer program product of claim 1 wherein determining the one or more expert rankings is based upon, at least in part, one or more of a number of code deliveries associated with the one or more software developers, a change in code complexity associated with the one or more software developers, a code quality change associated with the one or more software developers, a persistence of a code change associated with the one or more software developers, and a peer assessment associated with the one or more software developers.

3. The computer program product of claim 1 wherein the one or more current code elements are identified based upon, at least in part, a change frequency associated with one or more code elements.

4. The computer program product of claim 1 wherein the one or more current code elements are identified based upon, at least in part, receiving a threshold number of related inputs.

5. The computer program product of claim 1 wherein the one or more current code elements are identified based upon, at least in part, an amount of time one or more code elements form part of the active view.

6. The computer program product of claim 1 wherein the one or more current code elements are identified based upon, at least in part, a time-limited analysis.

7. The computer program product of claim 1 wherein identifying the one or more potential experts is based upon, at least in part, aggregating rankings associated with a plurality of the one or more current code elements.

8. The computer program product of claim 1 wherein identifying the one or more potential experts is based upon, at least in part, one or more geographical locations associated with the one or more software developers, one or more time zones associated with the one or more software developers, one or more online statuses associated with the one or more software developers, and one or more calendar entries associated with the one or more software developers.

9. A computer system comprising:
one or more processors; and
one or more memory architectures coupled with the one or more processors;
wherein the one or more processors are configured to:
map one or more software developers to one or more software code elements;
determine one or more expert rankings of the one or more software developers with respect to the one or more software code elements;
identify one or more current code elements associated with an active software developer;
determine an amount of time that at least one current code element of the one or more current code elements forms part of an active view;
determine, automatically, a need for an expert with the at least one current code element based upon, at least in part, the amount of time that the at least one current code element is in the active view;
receive, from the active software developer, a request for assistance from the expert; and
identify one or more potential experts based upon, at least in part, the one or more current code elements and the one or more expert rankings.

10. The computer system of claim 9 wherein determining the one or more expert rankings is based upon, at least in part, one or more of a number of code deliveries associated with the one or more software developers, a change in code complexity associated with the one or more software developers, a code quality change associated with the one or more software developers, a persistence of a code change associated with the one or more software developers, and a peer assessment associated with the one or more software developers.

11. The computer system of claim 9 wherein the one or more current code elements are identified based upon, at least in part, a change frequency associated with one or more code elements.

12. The computer system of claim 9 wherein the one or more current code elements are identified based upon, at least in part, receiving a threshold number of related inputs.

13. The computer system of claim 9 wherein the one or more current code elements are identified based upon, at least in part, an amount of time one or more code elements form part of the active view.

14. The computer system of claim 9 wherein identifying the one or more potential experts is based upon, at least in part, one or more geographical locations associated with the one or more software developers, one or more time zones associated with the one or more software developers, one or more online statuses associated with the one or more software developers, and one or more calendar entries associated with the one or more software developers.

* * * * *